United States Patent [11] 3,617,457

[72] Inventors Ichiro Sakurada
 Kyoto-shi, Kyoto-fu;
 Toshio Okada, Moriguchi-shi, Osaka-fu,
 both of Japan
[21] Appl. No. 765,413
[22] Filed Oct. 7, 1968
[45] Patented Nov. 2, 1971
[73] Assignee Japan Atomic Energy Research Institute
 Minato-ku, Tokyo, Japan
[32] Priority Oct. 16, 1967
[33] Japan
[31] 42/66093

[54] PROCESS FOR THE RADIATION GRAFTING OF 4-VINYL PYRIDINE ONTO POLYESTERS IN THE PRESENCE OF A NONPOLYMERIZABLE ORGANIC ACID
 8 Claims, 1 Drawing Fig.
[52] U.S. Cl. ........................................204/159.15,
 8/115.5, 260/873
[51] Int. Cl. ........................................ B01j 1/00,
 G08d 9/10
[50] Field of Search ............................204/159.15;
 260/863, 864, 873, 77.5 Q 77.5 Q4

[56] References Cited
UNITED STATES PATENTS
3,274,294 9/1966 Stanton et al. ................. 260/873
3,294,752 12/1966 Wilkinson ..................... 260/77.5
2,619,445 11/1952 Kalafus......................... 260/890
FOREIGN PATENTS
1,043,260 9/1966 Great Britain Primary Examiner—Murray Tillman
Assistant Examiner—Richard B. Turer
Attorney—Kurt Kelman ABSTRACT: Polyester fiber material which can be easily dyed with acidic, basic, direct and dispersed dyes was obtained by graft-polymerizing 4-vinyl pyridine onto a polyester fiber material in an aqueous emulsion containing a nonpolymerizable organic or inorganic acid at least in an amount sufficient to neutralize said 4-vinyl pyridine by means of irradiation with a high-energy ionizing radiation.

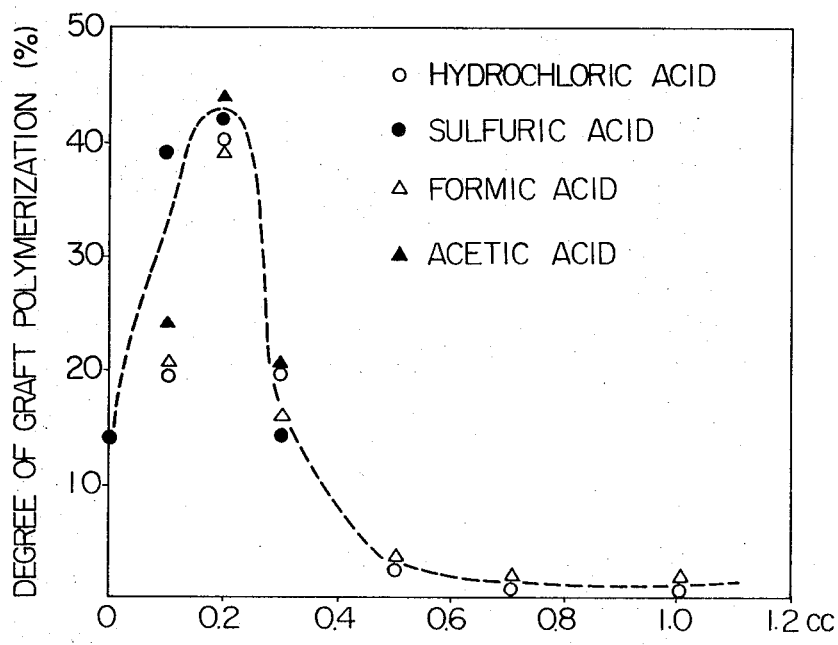

PROCESS FOR THE RADIATION GRAFTING OF 4-VINYL PYRIDINE ONTO POLYESTERS IN THE PRESENCE OF A NONPOLYMERIZABLE ORGANIC ACID

BACKGROUND OF THE INVENTION

Hydrophobic synthetic fibers such as polyesters and polyolefins are very difficult to dye. It was proposed and now it is publicly known to endow said synthetic fibers with dyeability by graft-polymerizing onto said fibers polymerizable organic acids, polymerizable organic bases, etc. having dye affinity.

However, polyester fibers are liable to hydrolyze in the presence of an acid or alkali, especially of the latter, and it is difficult to graft-polymerize (graft) a polymerizable unsaturated organic acid or a polymerizable unsaturated organic base thereonto without causing degradation due to hydrolysis of said fiber material when said fibers are treated in accordance with the prior art processes.

The polyester onto which 4-vinyl pyridine has been grafted can be dyed with acidic dyes, which have improved fastness against sunlight and washing. However, in order to acquire satisfactory dyeability by acidic dyes, it is necessary that the degree of graft polymerization be at least 15 percent, preferably 20 percent or more. When 4-vinyl pyridine is graft-polymerized, not only degradation of fiber and adhesion of filaments take place, but also uneven graft polymerization occurs, which results in uneven coloring when dyed. Therefore, technical difficulties and economic disadvantages are incurred in this prior art process, too, since 4-vinyl pyridine is a rather expensive monomer.

Having investigated various factors pertaining to the above-mentioned difficulties, we found that easily dyeable polyester fiber materials, which can be dyed satisfactorily by acidic, basic, direct, and dispersed dyestuffs, are obtained by graft-polymerizing 4-vinyl pyridine onto polyester fiber materials together with a smaller amount of a polymerizable unsaturated organic acid, such as acrylic acid, coexisting in the reaction system by means of pre-irradiation or simultaneous irradiation with a high-energy ionizing radiation. (Refer to cross reference)

We further developed our study and we now have found that, if we use a small amount of a nonpolymerizable organic or inorganic acid instead of the polymerizable unsaturated organic acid such as acrylic acid in the reaction system, we can obtain satisfactory result.

If we incorporate in a graft polymerization medium containing 4-vinyl pyridine a nonpolymerizable organic or inorganic acid in an amount of 3-20 percent by weight of said 4-vinyl pyridine, the rate of graft polymerization reaction is remarkably increased in contrast with the case in which only 4-vinyl pyridine is used, and, further, formation of sticky homopolymer of 4-vinyl pyridine is inhibited well, and thus efficiency of graft polymerization is enhanced, adhesion of filaments is minimized, and polyester fiber materials provided with satisfactory and even dyeability by acidic, basic, direct, and dispersed dyes can be manufactured. In this process little or no homopolymer is formed, and, therefore, the step of scrubbing the fiber for removing any formed homopolymer after the graft polymerization can be eliminated. This is a big contribution of this invention to industrial production of polyester fibers.

CROSS REFERENCE TO THE RELATED APPLICATION

The invention of this application is closely related to the invention of the copending U.S. Pat. application Ser. No. 757,467.

SUMMARY OF THE INVENTION

The process of this invention for manufacturing a polyester fiber material easily dyeable with acidic dyes, basic dyes, direct dyes, and dispersed dyes, comprises contacting a polyester fiber material with an aqueous graft polymerization medium containing 4-vinyl pyridine and a nonpolymerizable organic or inorganic acid at least in an amount sufficient to substantially neutralize said 4-vinyl pyridine and carrying out graft polymerization by means of irradiation with a high-energy ionizing radiation. The graft polymerization may be carried out by irradiating said fiber material before said fiber material is contacted with said graft polymerization medium.

The process of this invention is applicable to polyester fiber material in the form of fiber, filaments, stable fiber, yarn, tow, sliver, or fabric.

The polyester fiber material to which the process of this invention can be applied is the commercially available so-called polyester fiber including not only genuine polyethylene terephthalate, but also copolymer of ethylene with terephthalate and isophthalate, and blend of polyethylene terephthalate and isophthalate.

The nonpolymerizable acid to be incorporated in the graft polymerization medium containing 4-vinyl pyridine includes: inorganic acids such as hydrochloric acid, nitric acid, sulfuric acid, phosphoric acid, boric acid; monobasic saturated organic acids such as formic acid, acetic acid, propionic acid, n-butyric acid, isobutyric acid; dibasic saturated aliphatic carboxylic acids such as oxalic acid, succinic acid; hydroxy acids such as citric acid and malic acid; carboxylic acid derivatives such as monochloroacetic acid and trichloroacetic acid; aromatic acids and derivatives thereof such as benzoic acid, m-toluic acid, p-toluic acid, etc.

These acids are used in an amount sufficient to adjust the pH of the graft polymerization medium containing 4-vinyl pyridine to 7.0-6.0. The amount, of course, varies according to species of the used acid, but it is within the range of 3-20 parts by weight, preferably 5-15 parts by weight, per 100 parts by weight of 4-vinyl pyridine, the latter shows pH 8.8-9.2 in 2-20 percent aqueous solution at room temperature.

4-vinyl pyridine is used in the state of aqueous emulsion when the graft polymerization is carried out. Though the emulsified state can be maintained by mechanical agitation, to stabilize the emulsion, a surfactant, that is, a nonionic surfactant such as polyoxyethylene sorbitan monolaurate or sorbitan monolaurate, or a cationic surfactant such as stearyltrimethyl ammonium chloride or cetylpyridinium chloride is advantageously used in an amount 0.1-1.0 percent. Selection of kind and amount of the surfactant to be used can easily be made by those who are skilled in the art. Though there is no limitation in the concentration of 4-vinyl pyridine in the graft polymerization medium, it is preferably 2-20 percent by weight.

Any of the so-called high-energy ionizing radiations is applicable to the process of this invention, from corpuscular radiations such as neutron beams to electromagnetic waves such as gamma radiation and X-rays. It is now well known that these radiations have equal effect upon every kind of polymerization reactions. (Refer to "Atomic Radiations and Polymers" by A. Charlesby, Pergamon Press, England, 1960, if necessary) Therefore in the process of this invention, any kind of the high-energy ionizing radiation can be utilized. However, from the practical point of view, electron beams and gamma radiation are most suitable.

The dose to be applied varies according to the desired degree of graft polymerization, but usually it is selected from a range of $10^2$–$10^7$ roentgens. Selection of species of the ionizing radiation and dose or dose rate to be employed can be easily made by those skilled in the art.

The polyester material can be irradiated prior to contact with the graft polymerization medium (pre-irradiation) or simultaneously with the contact with the medium (simultaneous irradiation).

Irradiation may be carried out either in the presence or in the absence of air. However, if irradiation is carried out in vacuum or in a nitrogen environment, smaller dose suffices to attain the same degree of graft polymerization. Irradiation can be performed at a temperature in the range 10–100° C., but most preferred range is 40–60° C.

When the pre-irradiation method is employed, presence of air during the aftereffect graft polymerization does not impair the effect of this invention. However, if air is removed or replaced by nitrogen, a predetermined degree of graft polymerization is achieved by smaller dose or in a shorter period. Preferred reaction temperature is in the range 40–100° C.

The polyester fiber having at least 4 percent graft obtained by the process of this invention can be dyed with an acidic dye, e.g., Brilliant Scarlet 3R, as dark as wool is dyed; with direct dye, e.g., Congo Red as dark as cotton; with a basic dye, e.g., Crystal Violet, to moderate shade. The nongrafted original fiber cannot be dyed with these dyes. The fiber is dyed deep with a dispersed dye, e.g., Kayalon Fast Brown, while the original fiber is dyed to only moderate shade.

In addition to dyeability, the polyester fiber materials which are obtained by the process of this invention are remarkably improved in moisture absorption and antistatic properties in comparison with the original fiber.

In the following working examples, polyester fiber treated in accordance with this invention is subjected to extraction treatment prior to the graft polymerization, and thereafter, it is again subjected to extraction for the purpose of removing nongrafted homopolymers that may be formed. However, these steps were taken for the purpose of obtaining scientifically precise data, but are not indispensable steps in the practical application of this invention.

BRIEF EXPLANATION OF THE DRAWING

The attached sole drawing shows the relation between the amount of the acid added to the aqueous graft polymerization medium and the rate of graft polymerization reaction.

DETAILED DESCRIPTION OF THE EMBODIMENT

Now the invention is illustrated by way of working examples.

EXAMPLE 1

In 10 cc. of an aqueous emulsified graft polymerization medium comprising 10 parts by volume 4-vinyl pyridine, 90 parts by volume water and 0.5 percent by weight polyoxyethylene sorbitan monolaurate (emulsifier), to which 1 cc. of 1 M hydrochloric acid was added (the weight ratio of hydrochloric acid to 4-vinyl pyridine was 3.7:100) was immersed 0.1436 g. of polyethylene terephthalate fiber (5.5 denier × 18 filaments) containing no titanium oxide, which had undergone extraction treatment with carbon tetrachloride at the room temperature.

The reaction system was irradiated with gamma radiation from cobalt-60 at the dose rate of $1.1 \times 10^4$ roentgens per hour for 30 minutes at 50° C. in vacuum. The total dose was $0.6 \times 10^4$ roentgens. After the irradiation, no adhesion of filaments was observed. The irradiated sample was subjected to extraction treatment with ethanol at the room temperature for 24 hours and thus any formed homopolymer was removed. The weight gain of the sample was 0.0122 g. That is; a polyester fiber onto which 8.5 percent 4-vinyl pyridine was grafted was obtained.

This fiber was dyed with Brilliant Scarlet 3R, an acidic dye, as dark as wool was dyed; with Crystal Violet, a basic dye, to light blue; with Congo Red, a direct dye, as dark as cotton, and with Kayalon Fast Brown, a dispersed dye, to dark shade.

By way of comparison, the same sample was treated in the same way as above without adding hydrochloric acid in the graft polymerization medium. The obtained fiber had only 1.4 percent graft, which is remarkably low degree of graft polymerization in contrast with when hydrochloric acid was used. This fiber was dyed to moderate shade by a dispersed dye. But it was hardly or not dyed by the three other kinds of dye.

When a simple aqueous solution of 4-vinyl pyridine was used as the graft polymerization medium, 12.3 percent graft was attained by 4-hour irradiation. The thus-obtained graft-polymerized fiber was dyed with a dispersed dye to moderate shade; but with the three other kinds of dye, it was hardly dyed, or only to light shade if dyed.

Now it is apparent that, when a minor amount of hydrochloric acid is added to the copolymerization medium for graft-copolymerizing 4-vinyl pyridine onto polyester fiber, the rate of graft polymerization reaction is increased and dye affinity is imparted to the fiber with rather lower degree of graft polymerization.

EXAMPLE 2

The same polyethylene terephthalate fiber as used in example 1 was treated in the same way as example 1 except that duration of irradiation was 4 hours, that is, the total dose was $4.4 \times 10^4$ roentgens. After the irradiation, no adhesion of filaments was observed. After the irradiated fiber was subjected to extraction with ethanol for 24 hours at the room temperature, a graft-polymerized fiber having 75.5 percent graft was obtained.

By way of comparison, the same graft polymerization was carried out without addition of hydrochloric acid. The sample that had been irradiated for 4 hours exhibited remarkable adhesion of filaments. In order to remove the homopolymer of 4-vinyl pyridine and thus to dissolve the adhesion of filaments, it was necessary to wash the fiber with 10 percent aqueous solution of acetic acid for 15 days and further with ethanol for 1 day. The degree of graft polymerization was 12.3 percent.

It is apparent that addition of hydrochloric acid not only accelerates the graft polymerization reaction, but also inhibits formation of 4-vinyl pyridine homopolymer and thus prevents adhesion of the treated filaments.

EXAMPLE 3

Another polyethylene terephthalate fiber (10 denier × 18 filaments) containing 0.45 percent titanium oxide was washed with cold water for 24 hours. After dried, portions of each about 100 mg. of this fiber (18 filaments) were weighed accurately, and the portions were respectively put in test tubes (1 cm. in outside diameter) respectively containing the solutions indicated in table 1. After the headspace was replaced by nitrogen, the tubes were sealed, and they were irradiated with gamma radiation from cobalt-60 at the dose rate of $1.1 \times 10^4$ roentgens per hour for 6 hours at 50° C. The total dose was $6.6 \times 10^4$ roentgens.

After irradiation was finished, the portions of the fiber were washed with water and ethanol, dried and weighed. The degree of graft polymerization was calculated from the weight gain. The conditions and results were summarized in table 1.

TABLE 1

| Amount of 1 M HCl added*, cc. | Wt. ratio HCl/4-vinyl pyridine | pH of graft polymerization medium | Degree of graft polymerization, percent | Adhesion of filaments |
|---|---|---|---|---|
| 0 | 0 | 10.0 | 13.7 | Remarkable adhesion. |
| 1 | 3.7/100 | 6.7 | 18.9 | No adhesion. |
| 2 | 7.4/100 | 6.2 | 40.3 | Do. |
| 3 | 11.1/100 | 6.0 | 19.1 | Do. |
| 5 | 18.5/100 | 5.7 | 2.6 | Do. |
| 7 | 25.9/100 | 5.5 | 0.9 | Do. |
| 10 | 37.0/100 | 1.6 | 0.9 | Do. |

* Amount of 1 M acid added to 10 cc. of an aqueous emulsified system comprising 10 parts by volume 4-vinyl pyridine, 90 parts by volume water and 0.5% by weight polyoxyethylene sorbitan monolaurate.

As seen in table 1, it was revealed that addition of HCl to the graft polymerization medium in an amount of 3.7–11.1 parts per 100 parts 4-vinyl pyridine accelerates graft polymerization reaction and that it well prevents formation of homopolymer that causes adhesion of filaments.

EXAMPLE 4

The graft polymerization of polyethylene terephthalate fiber was carried out in the same way as in example 3 except that sulfuric acid was used instead of hydrochloric acid. Conditions and results are shown in table 2.

TABLE 2

| Amount of ½ M H₂SO₄ added*, cc. | Wt. ratio H₂SO₄/ 4-vinyl pyridine | pH of graft polymerization medium | Degree of graft polymerization, percent | Adhesion of filaments |
| --- | --- | --- | --- | --- |
| 0 | 0 | 10.0 | 13.7 | Remarkable adhesion. |
| 1 | 4.9/100 | 6.9 | 39.3 | No adhesion. |
| 2 | 9.8/100 | 6.5 | 42.3 | Do. |
| 3 | 14.7/100 | 6.3 | 17.4 | Do. |
| 5 | 24.5/100 | 5.9 | 3.4 | Do. |
| 7 | 34.3/100 | 5.4 | 1.0 | Do. |
| 10 | 49.0/100 | 2.4 | 1.1 | Do. |

*The same as in Table 1.

The effect of addition of sulfuric acid upon the rate of graft polymerization and prevention of adhesion of filament is clearly seen in table 2.

EXAMPLE 5

The graft polymerization of polyethylene terephthalate fiber was carried out in the same way as in example 3 except that formic acid was used instead of hydrochloric acid. Conditions and results are shown in table 3.

TABLE 3

| Amount of 1 M formic acid added,* cc. | Wt. ratio HCOOH/4-vinyl pyridine | pH of graft polymerization medium | Degree of graft polymerization, percent | Adhesion of filaments |
| --- | --- | --- | --- | --- |
| 0 | 0 | 10.0 | 13.7 | Remarkable adhesion. |
| 1 | 4.6/100 | 6.8 | 20.4 | No adhesion. |
| 2 | 9.2/100 | 6.4 | 39.1 | Do. |
| 3 | 13.8/100 | 6.2 | 16.9 | Do. |
| 5 | 23.0/100 | 5.8 | 2.9 | Do. |
| 7 | 32.2/100 | 5.4 | 1.2 | Do. |
| 10 | 46.0/100 | 4.5 | 1.1 | Do. |

*The same as in Table 1.

The effect of addition of formic acid upon the rate of graft polymerization and prevention of adhesion of filaments is clearly seen in table 3.

EXAMPLE 6

The graft polymerization of polyethylene terephthalate fiber was carried out in the same way as in example 3 except that acetic acid was used instead of hydrochloric acid. Conditions and results are summarized in table 4.

TABLE 4

| Amount of 1 M acetic acid added,* cc. | Wt. ratio HAc/4-vinyl pyridine | pH polymerization medium | Degree of graft polymerization, percent | Adhesion of filaments |
| --- | --- | --- | --- | --- |
| 0 | 0 | 10.0 | 13.7 | Remarkable adhesion. |
| 1 | 6/100 | 6.8 | 24.8 | No adhesion. |
| 2 | 12/100 | 6.6 | 44.2 | Do. |
| 3 | 18/100 | 6.4 | 20.3 | Do. |
| 5 | 30/100 | 6.1 | 2.4 | Do. |
| 7 | 42/100 | 5.9 | 1.5 | Do. |
| 10 | 60/100 | 5.1 | 1.6 | Do. |

*The same as in Table 1.

The effect of addition of acetic acid upon the rate of graft polyethylene terephthalate and prevention of adhesion of fibers is clearly seen in table 4.

EXAMPLE 7

The same polyethylene terephthalate fiber as used in example 3 (0.2683 g.) was put in a test tube 1 cm. in diameter, and 10 cc. of a 10 percent by volume aqueous emulsion of 4-vinyl pyridine and 2 cc. of a 1 M aqueous solution of nitric acid were added. The ratio of the amount of nitric acid to 4-vinyl pyridine was 12.6:100. Air in the headspace of the tube was replaced with nitrogen and the tube was sealed.

The tube was subjected to irradiation with gamma radiation from cobalt-60 at the dose rate $1.1 \times 10^4$ roentgens per hour for 6 hours at 50° C. The total dose was $6.6 \times 10^4$ roentgens After the irradiation, the fiber sample was taken out and no adhesion was observed.

By the same method as example 1, any formed homopolymer was removed, and the weight gain of the sample was 0.0676 g. That is, a graft-polymerized fiber having 25.2 percent graft was obtained. In contrast with the fiber that was graft-polymerized without using nitric acid attained only 13.7 percent of the degree of graft polymerization, and it exhibited marked adhesion of filaments.

EXAMPLE 8

The operation of example 7 was repeated, respectively 2 cc. and 4 cc. of ⅓ M aqueous phosphoric acid solution being used instead of 1 M aqueous nitric acid solution. The weight ratio of phosphoric acid to 4-vinyl pyridine was 6.6:100 and 13.2:100 respectively.

Adhesion of the fibers did not occur, and the degree of graft polymerization was 57.8 percent and 30.4 percent respectively.

EXAMPLE 9

The operation of example 7 was repeated, respectively 2 cc. and 4 cc. of ⅓ M aqueous solution of boric acid being used instead of 1 M nitric acid. The weight ratio of boric acid to 4-vinyl pyridine was 4.5:100 and 9.0:100 respectively.

Adhesion of filaments did not occur, and the degree of graft polymerization was 25.4 percent and 15.5 respectively.

EXAMPLE 10

The operation of example 7 was repeated, 2 cc. of 1 M aqueous solution of propionic acid being used instead of 1 M nitric acid. The ratio of propionic acid to 4-vinyl pyridine was 1.48:100.

Adhesion of filaments did not occur, and the degree of graft polymerization was 15.0 percent.

EXAMPLE 11

The operation of example 7 was repeated, 2 cc. of ½ M aqueous solution of oxalic acid being used instead of 1 M nitric acid. The ratio of oxalic acid to 4-vinyl pyridine was 6.3:100.

Adhesion of filaments did not occur, and the degree of graft polymerization was 22.2 percent.

EXAMPLE 12

The operation of example 7 was repeated, 2 cc. of ⅓ M aqueous solution of citric acid being used instead of 1 M nitric acid. The weight ratio of citric acid to 4-vinyl pyridine was 14:100.

Adhesion of filaments did not occur, and the degree of graft polymerization was 35.5 percent.

EXAMPLE 13

The operation of example 7 was repeated, 0.06 g. of benzoic acid being used. The weight ratio of benzoic acid to 4-vinyl pyridine was 6:100.

Adhesion of filaments did not occur, and the degree of graft polymerization was 31.7 percent.

EXAMPLE 14

The same polyethylene terephthalate fiber as used in example 3 (about 100 mg.) was irradiated in the air with electron beams ($1.5 \times 10^6$ ev–100 $\mu$a.) from a Van de Graaf electron accelerator. The total dose was 6.0 M rad. Immediately after the irradiation, the sample was put in a test tube 1 cm. in outside diameter, 10 cc. of a 10 percent by volume aqueous solution of 4-vinyl pyridine and 1 cc. of 1 M aqueous solution of hydrochloric acid were added thereto. The weight ratio of hydrochloric acid to 4-vinyl pyridine was 3.7:100. The head space of the tube was well replaced with nitrogen, and the tube was sealed and heated at 50° C. for 3 hours.

After the reaction, adhesion of filaments was not observed, and almost no homopolymer was formed. Thus, a graft-copolymerized polyethylene terephthalate fiber having 4.2 percent graft was obtained.

By way of comparison, the operation was repeated without using hydrochloric acid. After the reaction, precipitate of the formed 4-vinyl pyridine homopolymer was observed, and filaments were stuck together. The achieved degree of graft polymerization of 2.0 percent.

The attached sole drawing shows the relation between the amount of the acid added to the aqueous graft polymerization medium and the rate of graft polymerization reaction. In this experiment, the polyethylene terephthalate fiber samples were irradiated with gamma radiation from cobalt-60 at the dose rate of $1.1 \times 10^4$ roentgens per hour for 6 hours at 50° C. in contact with 10 cc. of an aqueous graft polymerization medium comprising 10 percent by volume aqueous emulsion containing 0.5 percent by weight of polyoxyethylene sorbitan monolaurate and some amount of 1 M aqueous solution of hydrochloric, sulfuric, formic or acetic acid.

As seen in the drawing, a maximum in the rate of graft polymerization reaction appears at the acid concentration of 0.2 cc. (1M) per 10 cc. of 10 percent by volume 4-vinyl aqueous emulsion. This amount of acid approximately corresponds to 0.2 mole per 1 mole of 4-vinyl pyridine for monobasic acid (0.2×½ mole for dibasic acid such as sulfuric acid) regardless of species of the used acid. This suggests that the effect of addition of the acid upon acceleration of graft polymerization reaction is not based on action of the acid swelling polyester fiber, but is the consequence of the acid taking part in the polymerization reaction, for instance, in the form of a salt or intermolecular compound, though we are not bound by a particular theory.

What is claimed is:

1. A process for manufacturing easily dyeable polyester fibers, comprising admixing ingredients comprising a major amount of 4-vinyl pyridine and a minor amount of a nonpolymerizable acid in an aqueous medium, contacting said mixture with polyester fibers and exposing said fibers to an irradiation in an amount sufficient for a copolymerization graft of at least about 0.9 percent based on the weight of grafted fibers when said fibers are contacted with said mixture, said major amount being sufficient to impart said 0.9 percent graft, and said minor amount being sufficient at least substantially to neutralize said 4-vinyl pyridine, to obtain a pH of said mixture ranging from about a pH 6.0 to about pH 7.0.

2. A process as defined in claim 1, in which said graft polymerization is carried out by means of pre-irradiation with a high-energy ionizing radiation.

3. A process as defined in claim 1, in which said graft polymerization is carried out by means of simultaneous irradiation with a high-energy ionizing radiation.

4. A process as defined in claim 1, in which the acid is selected from a class consisting of hydrochloric acid, nitric acid, sulfuric acid, phosphoric acid, boric acid; formic acid, acetic acid, propionic acid, n-butyric acid, isobutyric acid; oxalic acid, succinic acid; citric acid, malic acid; monochloroacetic acid, trichloroacetic acid; benzoic acid, m-toluic acid and p-toluic acid.

5. A process as defined in claim 1, in which the polyester is a polyethylene phthalate, and said irradiation is in a dose ranging from about $10^2$ to about $10^7$ roentgens.

6. A process as defined in claim 1, wherein the fibers are contacted with aid mixture at a temperature ranging from about 10 degrees Centigrade to about 100 degrees Centigrade.

7. A process as defined in claim 1, wherein the mixture is an aqueous emulsified medium and contains a surfactant.

8. A process as defined in claim 1, wherein the polyester is polyethylene terepthalate.

* * * * *